J. RALSTON.
COTTON GIN FEEDER.
No. 107,102.          Patented Sept. 6, 1870.
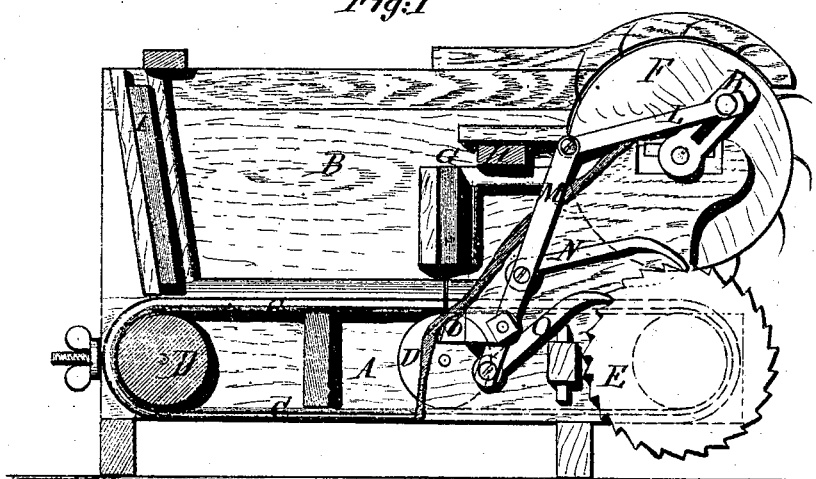
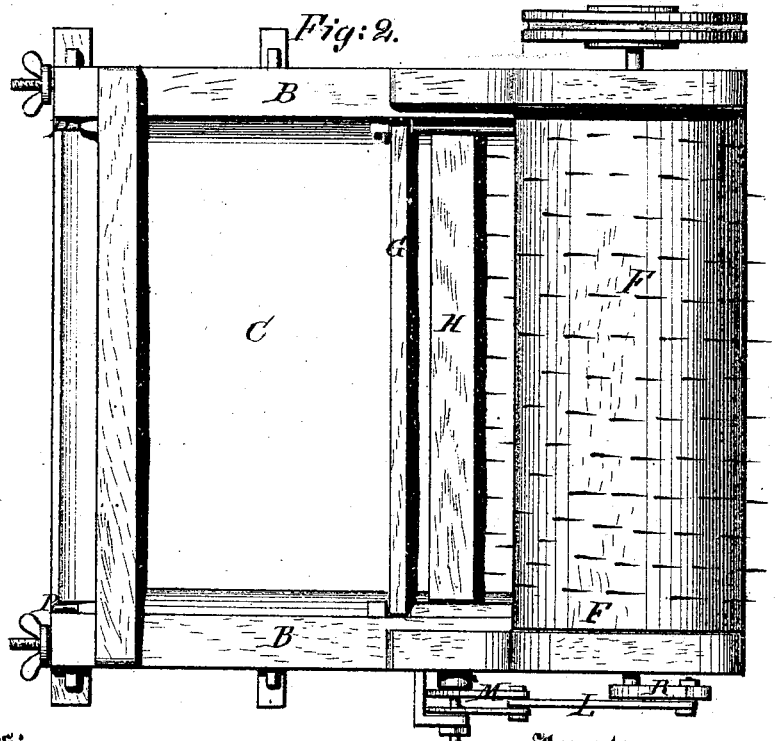

United States Patent Office.

JOE RALSTON, OF BRENHAM, TEXAS.

Letters Patent No. 107,102, dated September 6, 1870.

IMPROVEMENT IN COTTON-GIN FEEDER.

The Schedule referred to in these Letters Patent and making part of the same.

*To all whom it may concern:*

Be it known that I, JOE RALSTON, of Brenham, in the county of Washington and State of Texas, have invented a new and improved Cotton-gin Feeder; and I do hereby declare that the following is a full, clear, and exact description thereof, which will enable others skilled in the art to make and use the same, reference being had to the accompanying drawing forming part of this specification.

This invention consists in the arrangement of an endless apron, toothed cylinder, and toothed equalizing and distributing-bars, as hereinafter described.

Figure 1 is a longitudinal sectional elevation of my improved feeder attachment, and Figure 2 is a plan view of the same.

Similar letters of reference indicate corresponding parts.

A is the case or frame, having two side walls, B, and open at the top and ends.

C is an endless apron, arranged on rollers D in the bottom of the case, one of which is provided with a ratchet-wheel, E, for imparting motion to it.

F is a toothed cylinder or roller, placed at one end of the case, above the apron, to take the cotton therefrom and deliver it to the saws of the gin, the said end of the case in which it is placed being suitably arranged for the purpose, and so attached to the frame of the gin as to bring the teeth on the delivering side in the proper position relatively to the saws.

The movement of this cylinder at the under side is opposite to that of the apron, and the cotton is conquently taken from the said apron in advance of the point where the apron passes down under the end roller thereof.

G is a toothed equalizing-bar, placed in advance of the roller F, between the sides B, traversing the apron, with the teeth projecting downward, and arranged to be adjusted to or from the said apron.

H is a similar toothed equalizing-bar, placed considerably above the apron, and arranged to move to or from the toothed roller horizontally.

These bars are intended to equalize the delivery of the cotton from the apron to the cylinder by arresting and holding the excess supplied on the teeth thereof to be drawn off gradually by the teeth of the roller.

The cotton is supplied over the sides B, and spread on the apron by hand.

The gravel, sand, nails, and other heavy matters will naturally fall to the apron as the cotton is working along to the roller F, where it is taken up away from the apron, leaving the said matters thereon to be carried under the roller F and delivered over the end rollers D into any receptacle.

The said roller F is operated by a belt from any suitable power, and one end is provided with a crank, K, for working a pawl-lever, M, by a connecting-rod, L.

This pawl-lever has two pawls, N O, one above and the other below its fulcrum, working in the teeth of the ratchet-wheel E for driving the apron C.

The rod L is connected to the crank K in a radial slot, so that its movement may be made greater or lesser, for varying the speed of the apron.

To keep the apron extended in the breadth its full capacity at all times, I have provided it with cords P in the edges and between the edges, if required, and made grooves in the rollers D for the said cords, which, working in the grooves, prevent the apron from diminishing in breadth by stretching lengthwise.

The rear roller D is adjustable by two screws for tightening the belt c.

I am aware that a hooked-toothed cylinder for conveying cotton to the ginning device is not new, and I therefore have no desire to claim it specifically as a part of my invention.

Having thus described my invention,

I claim as new and desire to secure by Letters Patent—

The arrangement of the bars G and H with reference to the apron C and cylinder F, as and for the purpose specified.

JOE RALSTON.

Witnesses:
C. WITTEBORG,
F. GEHRMANN.